July 14, 1942. R. MONTGOMERY 2,289,717
SLIDE RULE FOR THE SIGHTLESS
Filed Nov. 15, 1940
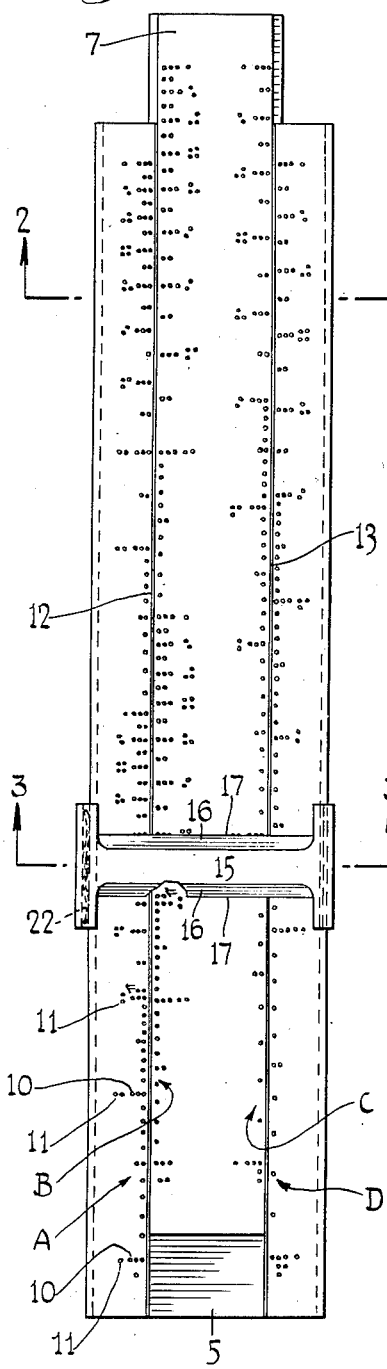
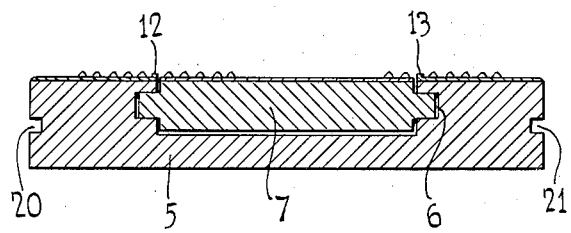
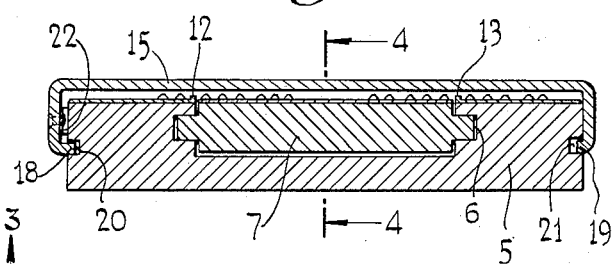
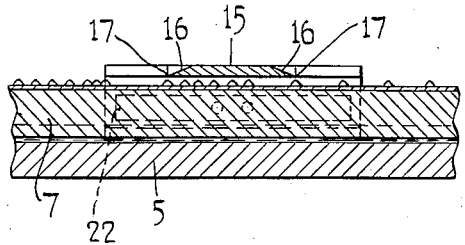
INVENTOR
RICHARD MONTGOMERY
BY
ATTORNEYS Patented July 14, 1942

2,289,717

UNITED STATES PATENT OFFICE 2,289,717

SLIDE RULE FOR THE SIGHTLESS

Richard Montgomery, New York, N. Y.

Application November 15, 1940, Serial No. 365,797

4 Claims. (Cl. 235—70)

The present invention has for an object to provide a slide rule for use of the sightless or persons of defective vision.

The study and practice of mathematical calculation presents particular difficulty when the worker is handicapped by impaired vision or total blindness and yet mathematics as a subject of study with the abstract reasoning required is of particular value in the education of the sightless.

The present invention provides a slide rule which is so constructed that it can be used by one depending entirely upon the sense of touch in manipulating and in reading the scales. All necessary lines are indicated by markings in relief, and in the preferred embodiment guide lines in relief are provided to avoid confusion between the markings on the different scales.

The nature and objects of the invention will be better understood from a description of an illustrative embodiment thereof for the purposes of which description reference should be had to the accompanying drawing forming a part hereof and in which—

Figure 1 is a plan view of a slide rule embodying the invention, and

Figs. 2, 3 and 4 are sectional views taken, respectively, on the lines 2—2, 3—3, and 4—4 of Fig. 1.

The slide rule shown for the purposes of illustrating the principles of the invention comprises a base 5 formed with a slide-way 6 to receive a slide 7. The base and slide carry the four scales A, B, C, D, as is usual in slide rules of a certain type. These scales are marked in relief whereby the blind person can read them by the sense of touch. The two adjacent scales A and B are similar. They are positioned along contiguous edges of the slide and base. Similarly, along two other contiguous edges are provided the two similar scales C and D. These scales as here shown are logarithmic as in the common slide rule. Also, the scales A and B provide two sets of numbers 1 to 10, or they may be considered as providing the numbers 1 to 100, whereas the scales C and D each provide one set of numbers 1 to 10. Furthermore, as in the common slide rule the scales A and D on the one hand, and the scales B and C on the other hand are positioned opposite each other to facilitate reading of squares and square roots. Lines corresponding to the logarithmically positioned numbers are indicated by properly selected dots or rows of dots in relief for convenient reading by the finger.

The most effective spacing of dots for reading by trained fingers has been determined from experience in the use of Braille, and the Braille standard spacing is adopted herein. As indicated in Fig. 1, the line positions corresponding to the primary numbers 1, 2, 3, etc. are indicated not only by the lines of three dots, as indicated at 10, but also by the dot or groups of dots, as at 11, which groups of dots are Braille for 1, 2, 3, etc. The intermediate positions between 1 and 2 and between 2 and 3 corresponding to secondary numbers, for example, 1.1, 1.2, 1.3, 2.1, 2.2, etc., are each indicated by two dots with or without groups of dots which are Braille for the numbers. Similarly, the intermediate tertiary numbers are represented by single dots with or without Braille numbers. Special commonly used numbers may be added. For example, $\pi$ is indicated on scales A and B by suitable dots.

Obviously, if there is no provision for separating the scales, for example the C and D scales, there is always the possibility that in some position of the slide an inaccuracy in reading may occur. In order to avoid such misreading, a line of division detectable by touch is preferably provided between the A and B scales and between the C and D scales. In the preferred embodiment illustrated, the object is accomplished by providing ribs 12 and 13 which separate the respective scales. As shown, these ribs are formed on the base rather than on the slide.

Accurate reading is facilitated by a slidable T-square or finger-guide 15 bevelled at 16 to provide transverse finger-guiding edges 17. Guide-tongues 18, 19 slidably engage grooves 20, 21 in the base and maintain the finger-guide in position with the edges 17 above but close to the dot projections for convenient reading. By the use of the guide 15 not only are the adjacent scales easily read in correct correlation, but all four scales as well, as in the reading of squares and square roots. A spring 22 at one side of the slide applies a slight tension to hold the guide squarely against one side of the base and maintain it in correct position. The tongue 19 is preferably short, so that the finger-guide can be readily removed from the base by pressure applied to the opposite side to free the tongue 19 from its groove and then lifting the guide from the base.

Twenty inches has been found to be a convenient length for the scales A, B, C, and D and four inches a convenient overall width for the rule. The selection of dimensions which correspond to an even number of inches is desirable as giving the blind an opportunity to acquire a sense of known dimensions.

The foregoing particular description of a selected embodiment is illustrative merely, and is not intended as defining the limits of the invention. Numerous modifications can be made without departing from the scope of the invention as defined in the appended claims.

I claim:

1. A logarithmic slide rule comprising a base and a slide movable thereon, the base and slide having along contiguous edges similar scales each consisting of marks in relief spaced logarithmically with Braille numbers adjacent several of said marks, said scales having as indicating marks series of projections, said base having a rib of less height than the projections extending along its edge throughout its length and between the scales.

2. A logarithmic slide rule comprising a base, having a longitudinal slide-way, a slide movable in the slide-way, the base and slide having along contiguous edges similar scales each consisting of marks in relief spaced logarithmically with Braille numbers adjacent several of said marks, and a finger-guide slidable on said base and presenting a guide portion transverse to the scales to facilitate reading of adjacent indications on the two scales, the base being formed with a rib projecting therefrom throughout its length between the two scales.

3. A logarithmic slide rule comprising a base and a slide movable thereon, the base and slide having along contiguous edges similar scales each consisting of marks in relief spaced logarithmically with Braille numbers adjacent several of said marks, said slide rule having between the two scales throughout its length a line in relief separating the two scales to prevent confusion of one scale with the other when reading said scales.

4. A logarithmic slide rule comprising a base member, a slide member movable thereon, the base member and slide member having along contiguous edges logarithmic scales in relief, and a finger-guide member movable along the scales to guide the finger from one scale to the other to facilitate comparison reading of the scales, one of said members having throughout its length a projection engageable by the finger when reading the scales and positioned to indicate the line of separation between the scales.

RICHARD MONTGOMERY.